(12) United States Patent
Hirasaka et al.

(10) Patent No.: US 6,633,452 B2
(45) Date of Patent: Oct. 14, 2003

(54) DISK DRIVE APPARATUS, HARD DISK DRIVE, AND ENCLOSURE FOR HARD DISK DRIVE

(75) Inventors: Yoshihiro Hirasaka, Sagamihara (JP); Keishi Takahasi, Fujisawa (JP); Kohji Serizawa, Yokohama (JP); Mutsuro Ohta, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 09/972,376

(22) Filed: Oct. 5, 2001

(65) Prior Publication Data

US 2002/0044375 A1 Apr. 18, 2002

(30) Foreign Application Priority Data

Oct. 13, 2000 (JP) ........................................ 2000-313253

(51) Int. Cl.[7] .............................................. G11B 5/012
(52) U.S. Cl. ................................ 360/97.01; 360/265.7; 360/265.8
(58) Field of Search ........................... 360/97.01, 265.7, 360/265.8; 369/75.1

(56) References Cited

U.S. PATENT DOCUMENTS

| 5,214,549 | A | * | 5/1993 | Baker et al. | ............. | 360/97.02 |
| 5,262,911 | A | * | 11/1993 | Cain et al. | ................ | 360/244.6 |
| 6,256,165 | B1 | * | 7/2001 | Kim | ........................ | 360/97.01 |
| 6,445,534 | B1 | * | 9/2002 | Tsuda et al. | ............. | 360/97.01 |

* cited by examiner

*Primary Examiner*—David L. Ometz
*Assistant Examiner*—Mark S Blouin
(74) *Attorney, Agent, or Firm*—Robert B. Martin; Bracewell & Peterson, L.L.P.

(57) ABSTRACT

A hard disk drive apparatus is capable of reducing a noise effectively during operation and capable of enhancing the reliability of the drive. The hard disk drive has first and second ribs that are formed near a pivot for an actuator so that a tilt of the pivot is prevented when the actuator is operated. Also, vibration absorbing members are interposed between the first and second ribs on the side of a base and a cover so that the vibration absorbing members are brought into contact with the cover. These vibration absorbing members are located in an intermediate portion between fixing places for fixing the cover to the base and a fixing place for fixing the cover to the pivot.

7 Claims, 10 Drawing Sheets

DISK DRIVE APPARATUS, HARD DISK DRIVE, AND ENCLOSURE FOR HARD DISK DRIVE

BACKGROUND OF THE INVENTION

1. Technical Field

The present invention relates to a disk drive apparatus, a hard disk drive, and an enclosure for a hard disk drive.

2. Description of the Related Art

Figure 9:
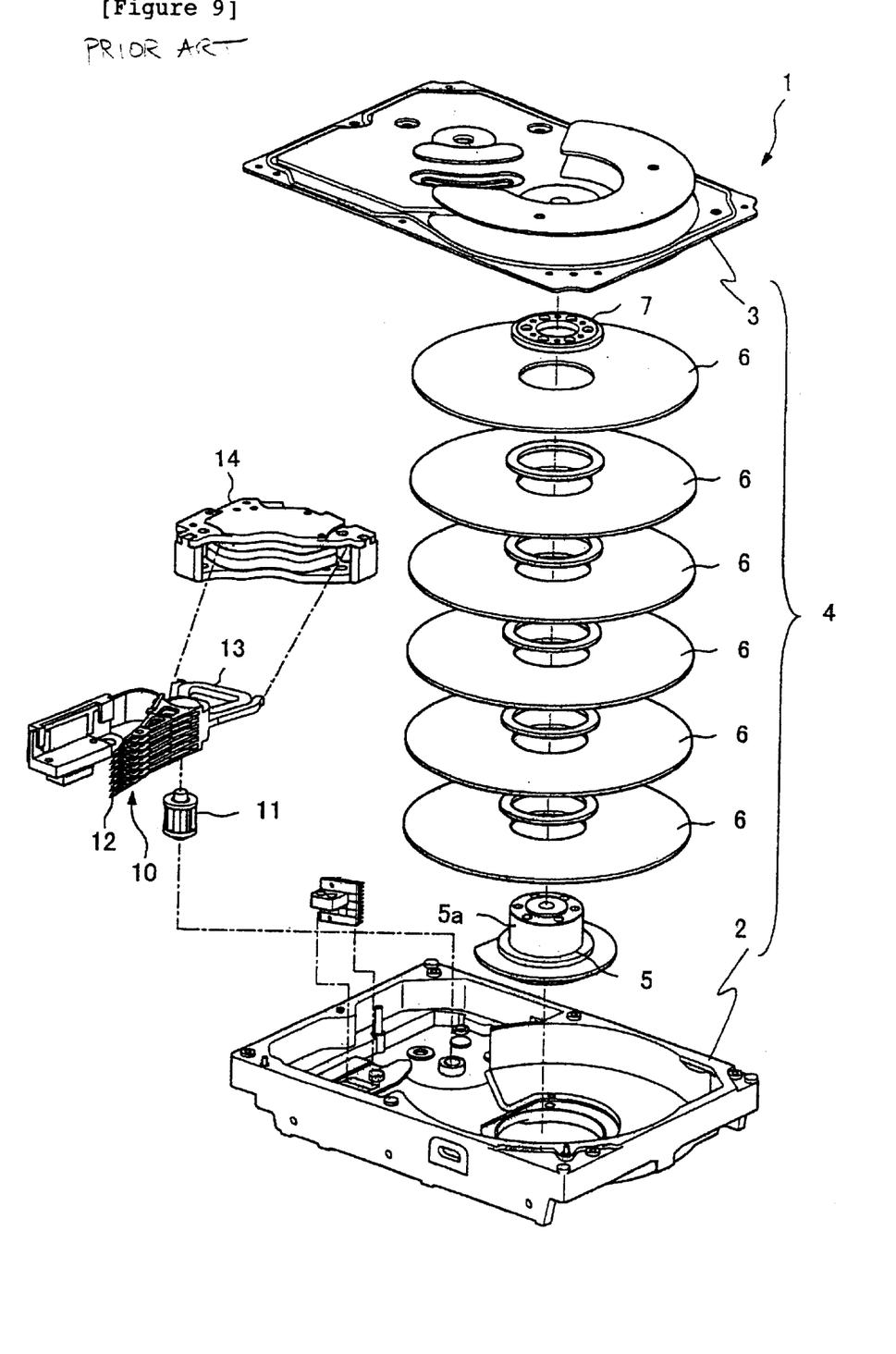
FIG. 9 is an exploded perspective view of a conventional hard disk drive.

As is well known, a hard disk drive has often been used as a main storage medium for data in a computer. FIG. 9 shows a typical example of a construction of a hard disk drive. In a hard disk drive 1 shown in FIG. 9, a disk enclosure 4 is constituted of a bottomed box-shaped base 2 with an opening in the upper part thereof and a cover 3 for sealing the upper opening of the base 2. In the disk enclosure 4 is provided a spindle motor 5 having an in-hub construction on the side of the base 2. On the spindle motor 5 are stacked a predetermined number of magnetic disks 6, which disks are fixed to a rotor 5*a* of the spindle motor 5 by means of a top clamp 7. These magnetic disks 6 are rotationally driven at a predetermined rotational speed by the spindle motor 5.

Also, in the disk enclosure 4 is provided an actuator 10. The actuator 10 is rotatably fixed to the base 2 via a pivot 11 in an intermediate portion. In a tip end portion of the actuator 10, there is provided a magnetic head 12 for reading and writing data stored on the magnetic disks 6. Also, at the rear end of the actuator 10 is provided a voice coil 13. On the other hand, the base 2 is provided with a stator 14, which cooperates with the voice coil 13, so as to be opposed to the voice coil 13. The voice coil 13 and the stator 14 constitutes a voice coil motor. This voice coil motor pivotally moves the actuator 10 around the pivot 11 by utilizing a magnetic force created between the voice coil 13 and the stator 14 by the supply of an electric current to the voice coil 13.

3. Problems to be Solved by the Invention:

In recent years, the throughput of a computer has increased remarkably, and also the storage capacity of the hard disk drive 1 has increased. Accordingly, the speed of data access must be increased. As a result, the rotational speed of the magnetic disk 6 has become dramatically higher than that of the conventional disk, which has resulted in various problems that the background art does not have.

For example, a noise problem arises when the hard disk drive 1 is operated. In the hard disk drive 1, a noise (sympathetic sound) due to resonance is sometimes produced in the cover 3 having a lower stiffness than the base 2. The reason for this is probably that the cover 3 is resonated by vibrations transmitted to the cover 3 through the base 2 when the magnetic disks 6 are rotated or by vibrations caused when the actuator 10 is operated, whereby a noise is produced.

To prevent this problem, conventionally, the natural frequency of the base 2 has been shifted from the frequency of the magnetic disk 6 in rotation and the frequency of the actuator 10 in operation by, for example, installing various types of damping members in several portions of the hard disk drive 1, whereby measures against resonance have been taken. However, a demand for reduction in noise has become increasingly strong. Moreover, the number of parts constituting the hard disk drive 1 is increased by the addition of the damping members, which leads to a rise in manufacturing cost. Therefore, such measures do not necessarily provide the best solution to the problem.

Also, there arises another problem of reliability when data is read and written. Specifically, with the increase in storage capacity, the recording density of the magnetic disk 6 has increased dramatically, and the distance between tracks in the radial direction of the magnetic disk 6 has become smaller. As a result, when data is read or written with the magnetic head 12, high accuracy is required in positioning the magnetic head 12 with respect to the magnetic disk 6 (more particularly, the track of the magnetic disk 6 in which the objective data is stored).

One of the factors greatly affecting the positioning accuracy for the magnetic head 12 is a change of the relative positional relationship between the actuator 10 and the magnetic disk 6 caused when the actuator 10 is operated. If this relative positional relationship changes, the positioning accuracy for the magnetic head 12 with respect to the magnetic disk 6 decreases. As a result, an error occurs in reading and writing data from and on the magnetic disk 6, or the reading and writing of data becomes impossible, which presents a problem in that the reliability of the hard disk drive 1 decreases.

The present invention has been made to solve the above-described technical problems, and accordingly a principal object thereof is to provide a disk drive apparatus capable of effectively reducing noise in operation. Also, another object of the present invention is to provide a disk drive apparatus, a hard disk drive, and an enclosure therefor capable of enhancing the reliability.

SUMMARY OF THE INVENTION

To achieve the above objects, the inventors made a study earnestly to determine causes of a decrease in positioning accuracy for the magnetic head 12 when the actuator 10 is operated. As the result of the study, we found that the fact that the pivot 11 for supporting the actuator 10 is displaced in a different direction with respect to the axis thereof, that is, it is tilted (hereinafter, this phenomenon is referred to as a tilt) contributes greatly to the above problems.

As shown in FIG. 10A, the pivot 11 is mounted to a boss 16 provided at the bottom of the base 2. As shown in FIG. 10B, the boss 16 is formed with a recess 16*a* in which the lower end portion of the pivot 11 is set and a screw hole 16*b* formed in the central portion of the recess 16*a*. The pivot 11 is attached to the base 2 by fastening the lower end portion thereof set in the recess 16*a* with a screw 18 from the back face of the base 2 through the screw hole 16*b*. Further, the upper end portion of the pivot 11 is fixed to the cover 3 with a screw 19. However, the cover 3 has a lower stiffness than the base 2, so that this fixation is complementary. Therefore, the pivot 11 is substantially in a state in which the lower end portion thereof is supported on the base 2 in a cantilever manner. Whether a tilt of the pivot 11 occurs or not depends on the stiffness of the bottom portion of the base 2.

If the frequency (resonance frequency) when the actuator 10 is driven is close to the natural frequency (resonance frequency) of the base 2, a tilt of the pivot 11 is produced by resonance. The tilt of the pivot 11 for the actuator 10 occurring in this manner has an adverse influence on the positioning accuracy for the magnetic head 12 with respect to the magnetic disk 6.

To restrain the tilt of the pivot 11, an increase in stiffness of the bottom portion of the base 2 is thought, and for this purpose, an increase in the thickness of the bottom plate of the base 2 is thought. However, the increase in the thickness of the bottom plate of the base 2 decreases an internal space of the disk enclosure 4, so that an increase in the number of magnetic disks 6 demanded by an increase in storage capacity in recent years is sometimes hindered.

The disk drive apparatus in accordance with the present invention, which has been made in consideration of such a respect, is characterized in that in an enclosure for containing a disk driving source and an actuator, a rib extending from a peripheral wall toward a rotating shaft of the actuator is provided on a bottom plate for supporting the rotating shaft. Such a rib can reinforce the bottom plate of the enclosure in the vicinity of the rotating shaft. Also, when the rib is provided on both sides of the axis of the rotating shaft, a connection rib for connecting both of the ribs to each other is formed, whereby the reinforcing effect is further increased.

Such a disk drive apparatus is not limited to what is called a hard disk drive, and may be of any other types. Also, a disk-like medium is not limited to one that is incorporated in the disk drive apparatus. For example, a type in which data is read from and written on a detachable disk-like medium by pivotally moving the actuator may be used.

Also, the disk drive apparatus in accordance with the present invention can be characterized in that a vibration absorbing member in contact with a cover is provided on the inside of a portion opposed to the peripheral wall. The vibration absorbing member being in contact with the inside of the cover in this manner can restrain resonance of the cover occurring in the case where the actuator is operated or in other cases.

The position of the vibration absorbing member is not necessarily subject to any restriction, and the vibration absorbing member may be located in any position on the inside of the portion opposed to the peripheral wall. For example, if the vibration absorbing member is provided between a portion where the cover is fixed to the peripheral wall of the enclosure at the outer periphery thereof and a portion where the cover is fixed to the rotating shaft of the actuator on the inner peripheral side, vibrations can be absorbed efficiently. Also, the vibration absorbing member can be held between a wall body formed around an actuator driving source for driving the actuator and the cover. As such a wall body, for example, a rib for reinforcing the enclosure can be used. It is a matter of course that the wall body may be one having another purpose.

The hard disk drive in accordance with the present invention can be characterized in that on a base constituting a disk enclosure, a stiffness reinforcing portion is formed at an area where a reaction force acts via a pivot when the actuator moves pivotally. Such an area is preferably set on a line that substantially makes right angles to the axis of the actuator and passes through the pivot. By reinforcing the stiffness at such an area, the pivot can be prevented from oscillating when the actuator moves pivotally. Also, as the stiffness reinforcing portion, a rib can be formed on a bottom plate of the base. In addition, at the aforementioned area, the thickness of the bottom plate of the base can be increased, or the bottom plate thereof can be formed of a material with higher stiffness.

The rib is provided on both sides of the pivot, and is extended from two sides adjoining each other of the peripheral wall, by which the bottom plate of the base can be reinforced in a substantially triangular shape around the pivot, which provides efficient reinforcement. Also, the rib may be substantially of an L shape formed of an extending portion and a bent portion. In this case, if the extending portion and the bent portion are configured so as to intersect at a fixed angle, for example, substantially at 45 degrees with respect to the line that substantially makes right angles to the axis of the actuator and passes through the pivot, the reaction force acting via the pivot when the actuator moves pivotally is applied slantwise to the portion where the extending portion and the bent portion of the rib are provided, by which the reaction force can be distributed into two directions.

Also, the present invention can provide an enclosure for a hard disk drive, in which on the bottom plate are formed a pivot attaching portion to which a pivot is attached to support the actuator and a rib formed between the pivot attaching portion and the peripheral wall.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIGS. 5A and 5B are charts showing measurement results when vibration frequency is changed in a case where a rib is present, FIG. 5A shows a change in phase, and FIG. 5B shows the magnitude of vibration.

FIGS. 6A and 6B are charts showing measurement results when vibration frequency is changed in a case where a rib is absent, FIG. 6A shows a change in phase, and FIG. 6B shows the magnitude of vibration.

FIGS. 7A and 7B are charts showing measurement results when vibration frequency is changed in a case where vibration absorbing members are present, FIG. 7A shows a change in phase, and FIG. 7B shows the magnitude of vibration.

FIGS. 8A and 8B are charts showing measurement results when vibration frequency is changed in a case where vibration absorbing members are absent, FIG. 8A shows a change in phase, and FIG. 8B shows the magnitude of vibration.

DETAILED DESCRIPTION OF THE PREFERRED EMBODIMENT

Figure 10:
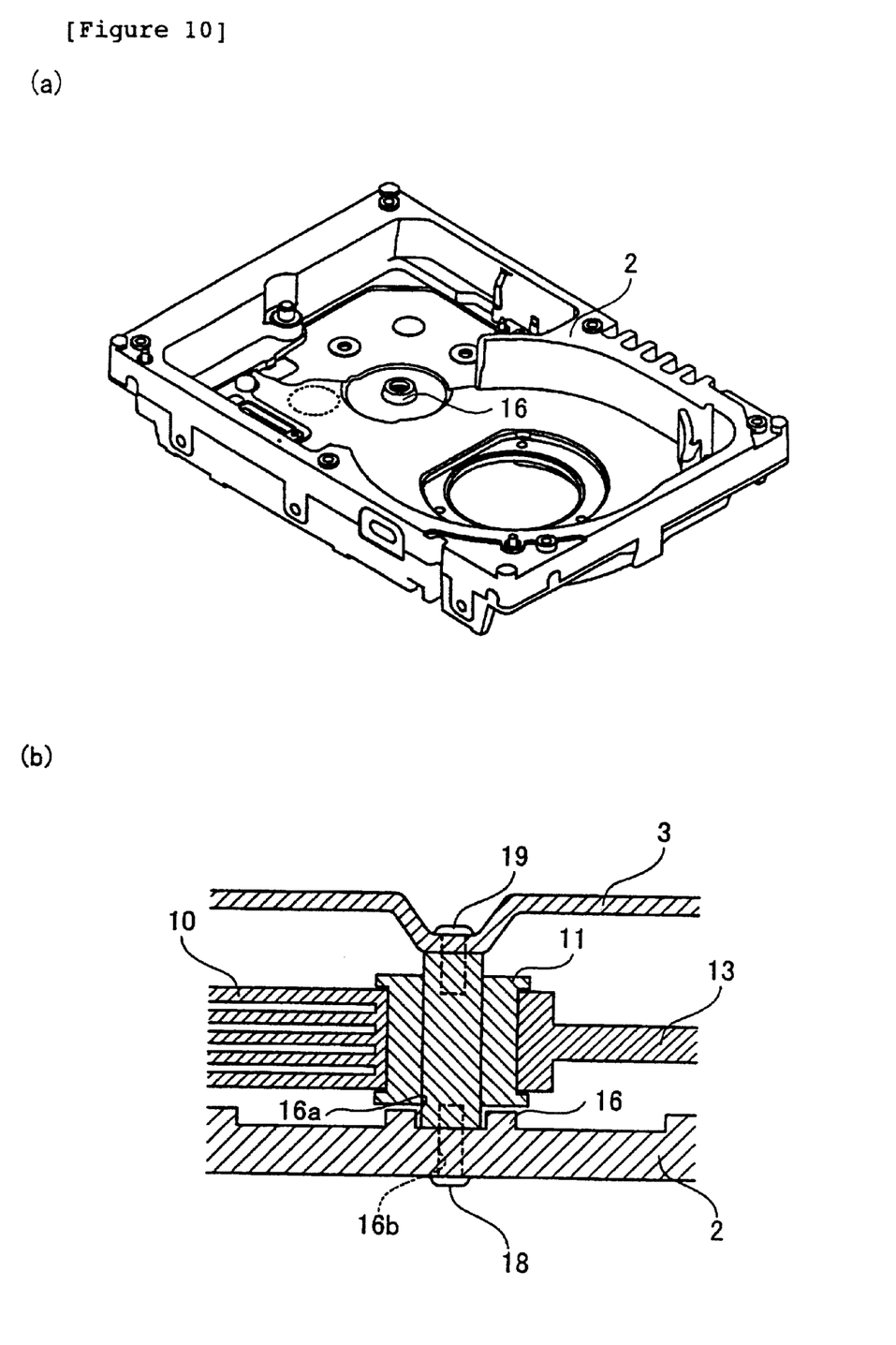
FIG. 10A is a perspective view of a base.
FIG. 10B is a sectional view of an actuator and the base of FIG. 10A.

The present invention will now be described in accordance with an embodiment shown in the accompanying drawings. In the following description, the same reference numerals are applied to the same elements as those in the hard disk drive 1 shown in FIGS. 9 and 10, and the explanation of these elements is omitted.

Figure 1:
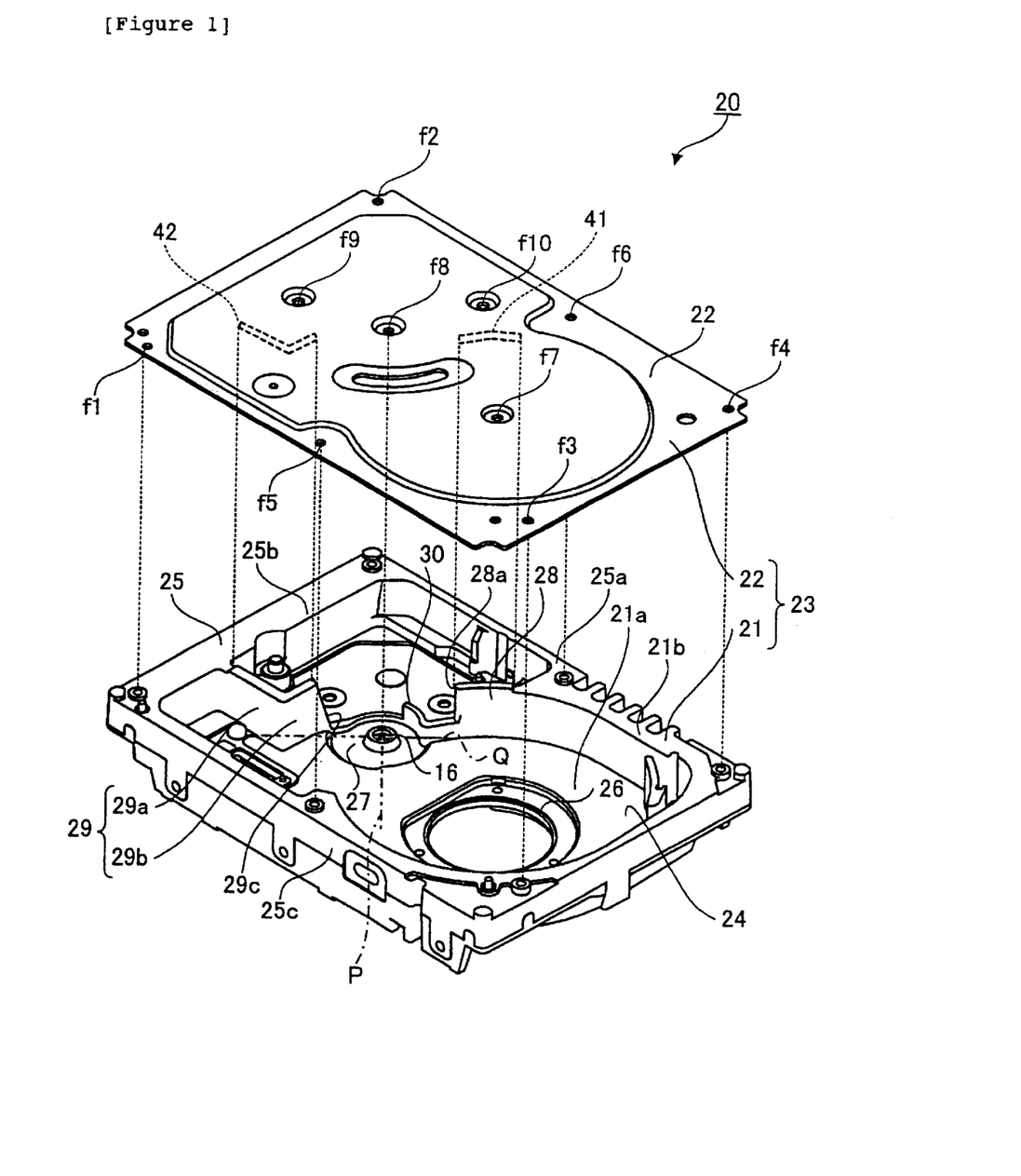
FIG. 1 is a perspective view of a base and a cover for a hard disk drive constructed in accordance with one embodiment of the present invention.

As shown in FIG. 1, in a hard disk drive (disk drive apparatus) 20 of this embodiment, a disk enclosure 23 is constituted of a bottomed box-shaped base (enclosure) 21 with an opening in the upper part thereof and a cover 22 for sealing the upper opening of the base 21.

Figure 2:
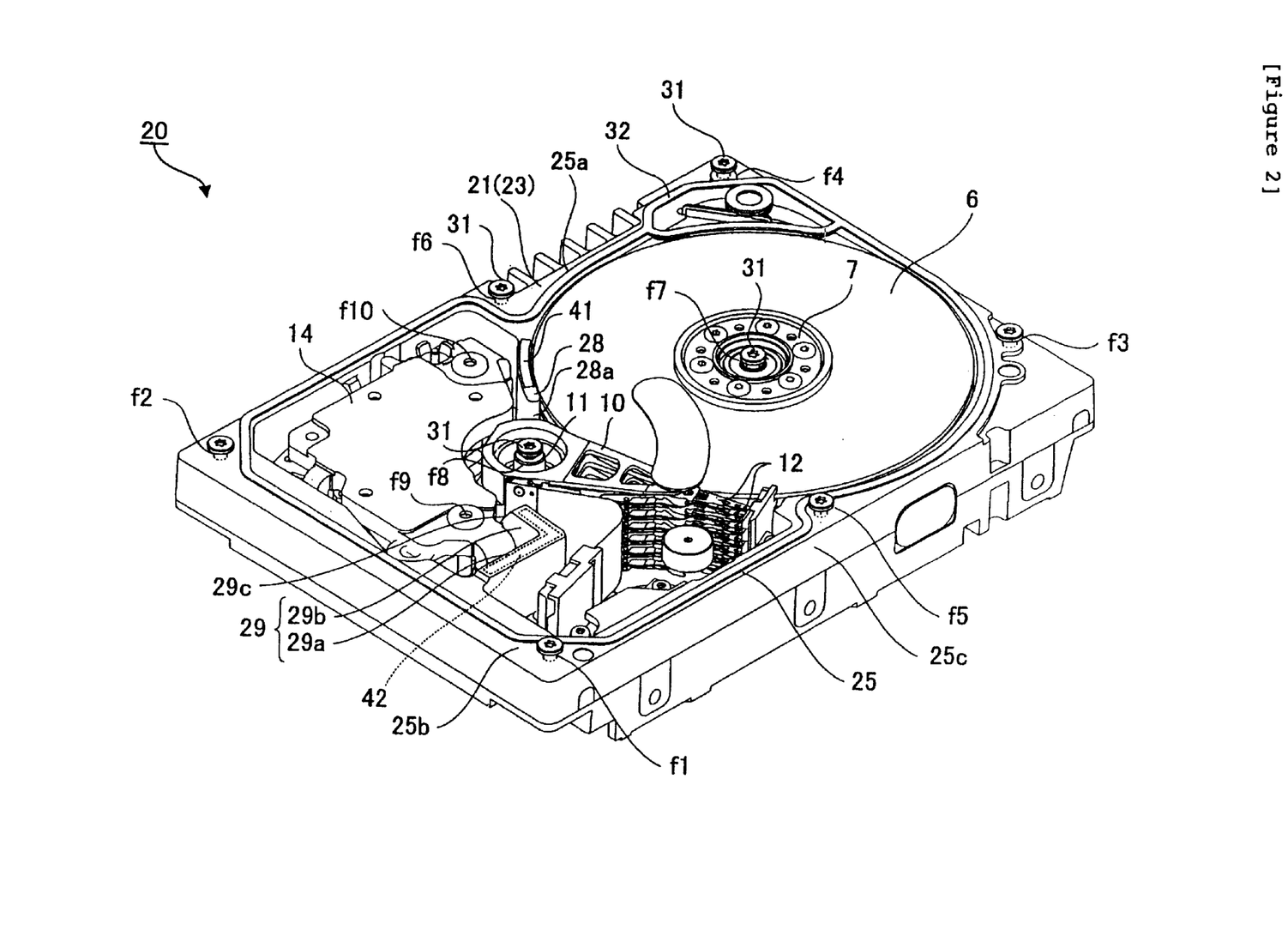
FIG. 2 is a perspective view of the hard disk drive.

As shown in FIG. 2, in the disk enclosure 23, a predetermined number of magnetic disks (disk-like media) 6 are stacked on a spindle motor (disk driving source; not shown) having an in-hub construction provided on the side of the base 21, which disks are fixed by means of a top clamp 7. These magnetic disks 6 are rotationally driven at a predetermined rotational speed by the spindle motor. Further, in the disk enclosure 23 is provided an actuator 10. The actuator 10 is rotatably fixed to the base 21 via a pivot 11 in an intermediate portion. In a tip end portion of the actuator 10, there is provided a magnetic head (head) 12 for reading and writing data stored on the magnetic disks 6. Also, the base 21 is provided with a stator 14 for generating a magnetic field between the stator 14 and a voice coil 13 (see FIG. 9) which is provided at the rear end of the actuator 10. The voice coil 13 and the stator 14 constitute a voice coil motor serving as an actuator driving source for pivotally moving the actuator 10.

According to the above-described configuration, the actuator 10 is pivotally moved around the pivot 11 by the drive of the voice coil motor, so that the magnetic head 12 can seek in a substantially radial direction of the magnetic disk 6, and can move to a position opposed to the objective track of the magnetic disk 6.

In the disk enclosure 23 having a substantially rectangular shape in the plan view, the magnetic disks 6 are disposed so as to be shifted to one side in the lengthwise direction, and the actuator 10 and the stator 14 are disposed on the other side. Further, the pivot 11 for the actuator 10 is located near the centerline in the width direction (short-side direction) of the base 21, and the stator 14 is disposed in the corner portion of the base 21.

As shown in FIG. 1, the base 21 constituting the disk enclosure 23, having a substantially rectangular shape in the plan view, is formed of a bottom plate 24 forming the bottom surface thereof and a peripheral wall 25 rising upward at the outer periphery of the bottom plate 24. In a space surrounded by the peripheral wall 25 on the bottom plate 24, the magnetic disks 6, the actuator 10, the stator 14, and the like are contained as shown in FIG. 2. Also, as shown in FIG. 1, the bottom plate 24 is formed with a hole 26 for mounting the spindle motor (not shown) for rotationally driving the magnetic disks 6 and a recess 27 provided with a boss (pivot mounting portion) 16 in the central portion to mount the pivot 11.

Further, as shown in FIGS. 1 and 2, on the bottom plate 24 of the base 21, there is integrally formed first and second ribs 28 and 29 extending from the peripheral wall 25 toward the pivot 11 on both sides of the axis of the pivot 11 as a rib, wall body, and stiffness reinforcing portion. The first rib 28 extends along the outer periphery of the magnetic disks 6 contained in the base 21 from one side wall 25a extending in the lengthwise direction, of the peripheral wall 25, and the tip end portion 28a thereof is located near the actuator 10. Also, the second rib 29, substantially having an L shape in the plan view, is made up of a vertical rib portion (extending portion) 29a extending substantially at right angles from a side wall 25b, extending in the short-side direction on the side on which the stator 14 is provided, of the peripheral wall 25, and a parallel rib portion (bent portion) 29b which is bent from the tip end of the vertical rib portion 29a toward the pivot 11 and extends substantially in parallel with the side wall 25b.

These first and second ribs 28 and 29 are formed so as to have about the same height as the peripheral wall 25 (strictly, the peripheral wall 25 and the first and second ribs 28 and 29 have a slight difference in level because the cover 22 is formed so as to have a slight difference in level between a portion in contact with the upper face of the peripheral wall 25 and other portions).

As shown in FIG. 1, between the tip end portion 28a of the first rib 28 and a tip end portion 29c of the second rib 29, a third rib (connection rib) 30 having a height that does not interfere with the pivot 11 is continuously formed in a portion along the outer periphery of the recess 27.

Figure 3:
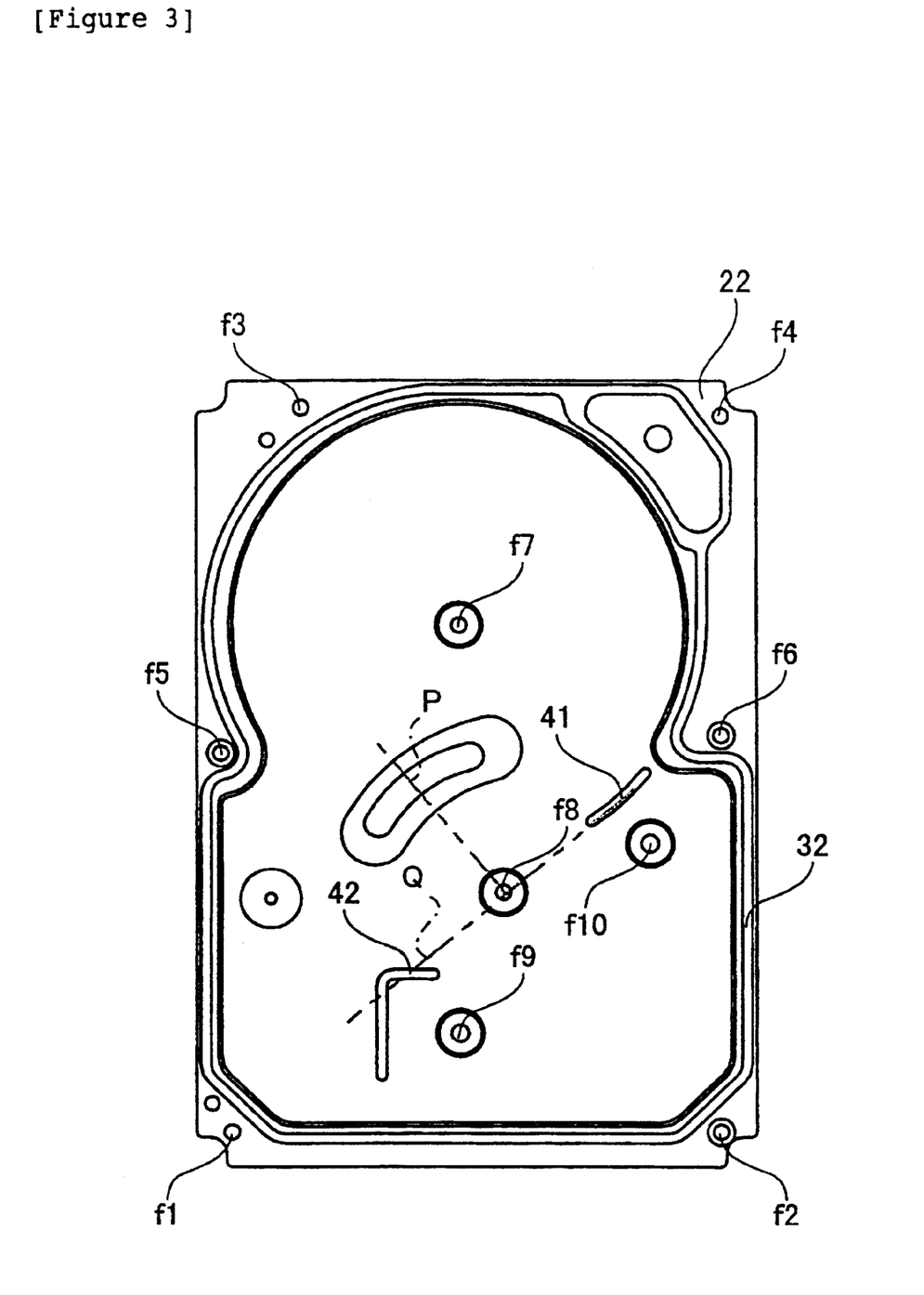
FIG. 3 is a plan view of a cover face opposed to a base of the hard disk drive.

As shown in FIGS. 1 to 3, the cover 22 for covering the upper opening of the base 21 constructed as described above is fixed to the base 21 with a plurality of screws 31 (see FIG. 2). More specifically, the cover 22 is fixed to the base 21 at a total of six fixing places f1 to f6 of four corners of the peripheral wall 25 and intermediate portions of the side walls 25a and 25c in the lengthwise direction. Further, the cover 22 is fixed to the base 21 with the plural screws 31 at a total of four places (fixing places f7 to f10) of the top clamp 7 located coaxially with the spindle motor (not shown), the pivot 11 for the actuator 10, and the stator 14 (two places).

Between the cover 22 and the peripheral wall 25 of the base 21, there is provided a gasket 32 made of a rubber-based material such as fluororubber. This gasket 32 isolates the interior of the cover 22 and the base 21, that is, the disk enclosure 23 from the outside air. The gasket 32 is bonded beforehand to either one of the cover 22 and the base 21 (in this embodiment, to the side of the cover 22).

Also, between the cover 22 and the upper faces of the first and second ribs 28 and 29 of the base 21 are provided vibration absorbing members 41 and 42. The vibration absorbing members 41 and 42, which are interposed in a pressed state between the cover 22 fastened to the base 21 at the plural places and the first and second ribs 28 and 29 on the side of the base 21, prevents vibrations (resonances) of the cover 22. Therefore, as the material of the vibration absorbing members 41 and 42, a material that is softer than the cover 22 and has elasticity, for example, a rubber-based material is preferably used. In this embodiment, considering the cost and other factors, fluororubber etc. that are the same as the material of the gasket 32 are used. These vibration absorbing members 41 and 42, like the gasket 32, are bonded beforehand to the side of the cover 22 or the base 21 on which the gasket 32 is bonded (in this embodiment, to the side of the cover 22).

The first rib 28 is located in an intermediate portion between the fixing place f6 for fixing the cover 22 to the intermediate portion of the peripheral wall 25 and the fixing place f8 for fixing the cover 22 to the pivot 11. Therefore, the vibration absorbing member 41 is pressed on the cover 22 in the intermediate portion between the fixing places f6 and f8. Also, the second rib 29 is located in an intermediate portion between the fixing place f1 for fixing the cover 22 to the corner of the peripheral wall 25 and the fixing place f8 for fixing the cover 22 to the pivot 11. Therefore, the vibration absorbing member 42 is pressed on the cover 22 in the intermediate portion between the fixing places f1 and f8.

In the hard disk drive 20 constructed as described above, the vibration absorbing members 41 and 42 are in contact with the cover 22, so that the resonances of the cover 22 can be reduced. Since the vibration absorbing members 41 and 42 are located at two places of the intermediate portion between the fixing places f6 and f8 and the intermediate portion between the fixing places f1 and f8, that is, in a portion where the amplitude of vibration occurring in the cover 22 is great, the resonances can be restrained effectively. Thus, a noise generated from the cover 22 by resonances can be reduced.

Also, since the vibration absorbing members 41 and 42 are provided between the base 21 and the cover 22 by utilizing the portions of the first and second ribs 28 and 29 provided to reinforce the base 21, a new part other than the vibration absorbing members 41 and 42 is unnecessary. Moreover, the vibration absorbing members 41 and 42 can be installed to the cover 22 together with the gasket 32 in the manufacturing process, so that an increase in manpower and cost in manufacturing can be restrained.

Also, in the hard disk drive 20, the first and second ribs 28 and 29 are formed near the pivot 11 for the actuator 10. When the actuator 10 is operated, a reaction force acts on the pivot 11 in a direction along a line Q (see FIG. 3) which makes right angles to an axis P of the actuator 10 (see FIG. 3; direction in which the pivot 11 and the magnetic head 6 are connected to each other) and passes through the pivot 11. By this reaction force, the pivot 11, the lower end of which is supported by the base 21 with high stiffness and the upper end of which is supported by the cover 22 with low stiffness, is subjected to a moment in a direction in which the upper end thereof is tilted. By this moment, an area at which the first and second ribs 28 and 29 are provided (an area including a line which passes through the pivot 11 and makes right angles to the axis of the actuator 10) on the bottom plate 24 of the base 21 is subjected to a force such as to deform the bottom plate 24. However, the stiffness of the bottom plate 24 in such an area is increased effectively by the first and second ribs 28 and 29. Moreover, the first and second ribs 28 and 29 are formed continuously with the peripheral wall 25, and further the first rib 28 is formed substantially into an L shape, so that the reinforcing effect of the ribs is very large.

In addition, the first and second ribs 28 and 29, which extend from the side walls 25a and 25b adjoining each other of the peripheral wall 25 toward the pivot 11, reinforce the bottom plate 24 of the base 21 slantwise like what is called a brace. Therefore, the vicinity of the pivot 11 can be reinforced effectively as compared with a case where the ribs are extended from two sides opposed to each other of the peripheral wall 25. Further, the substantially L-shaped second rib 29 has the vertical rib portion 29a and the parallel rib portion 29b located substantially at 45 degrees with respect to the direction in which a moment acts when the pivot 11 tends to tilt, that is, the direction at right angles to the axis of the actuator 10. Therefore, the moment acting on the second rib 29 can be distributed into two directions, so that the efficiency is high in this respect as well.

Thereupon, the tilt of the pivot 11 caused when the actuator 10 is pivotally moved is prevented by the first and second ribs 28 and 29, so that the relative displacement of the actuator 10 with respect to the magnetic disk 6 can be restrained. Also, the increase in stiffness of the bottom plate 24 of the base 21 provided by the first and second ribs 28 and 29 enables the resonance frequency of the base 21 to be shifted. Therefore, when the actuator 10 is operated, the frequency thereof is prevented from coinciding with the resonance frequency of the base 21, so that the tilt of the pivot 11 can be prevented in this respect as well. Thus, an error in reading and writing data with the magnetic head 12 and other errors are prevented, so that the reliability of the hard disk drive 20 can be enhanced.

Figure 4:
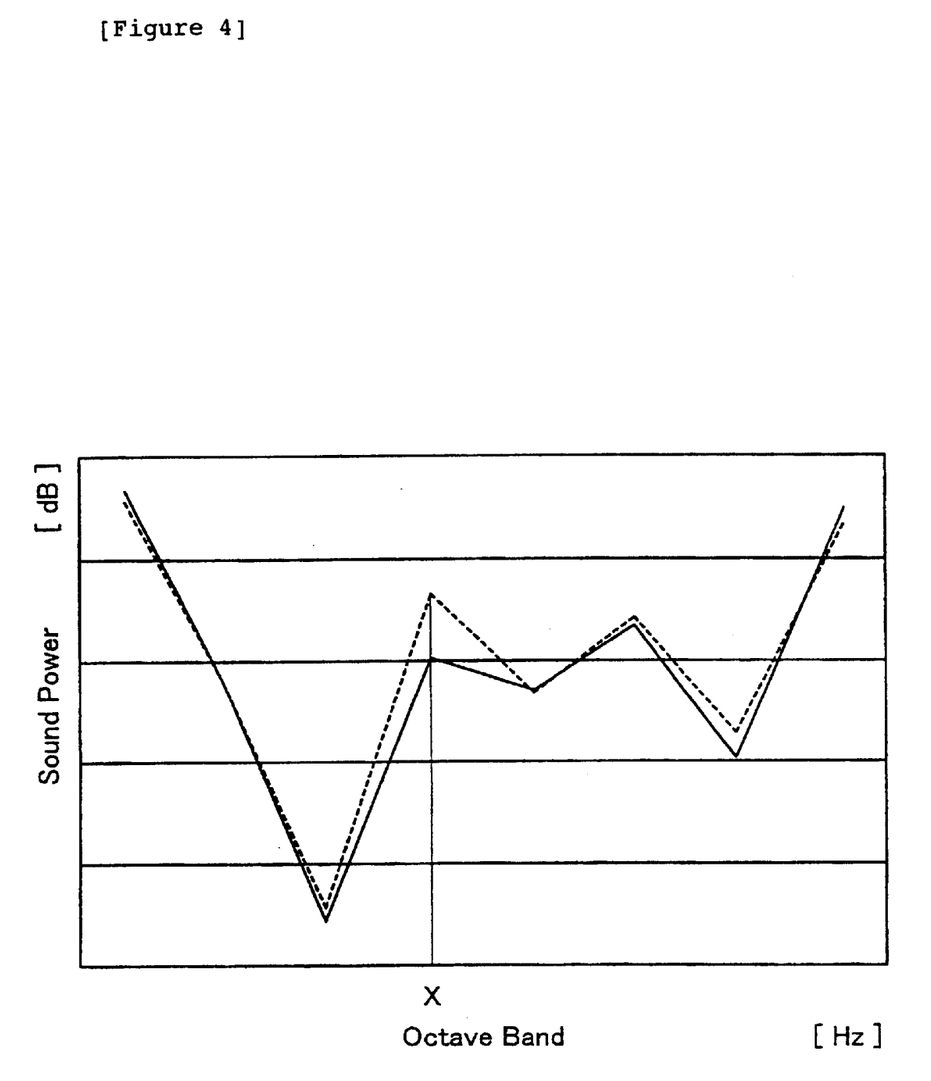
FIG. 4 is a chart of a difference in a change in sound power when an octave band is changed in a case where a rib is present and a case where a rib is absent.
Figure 5:
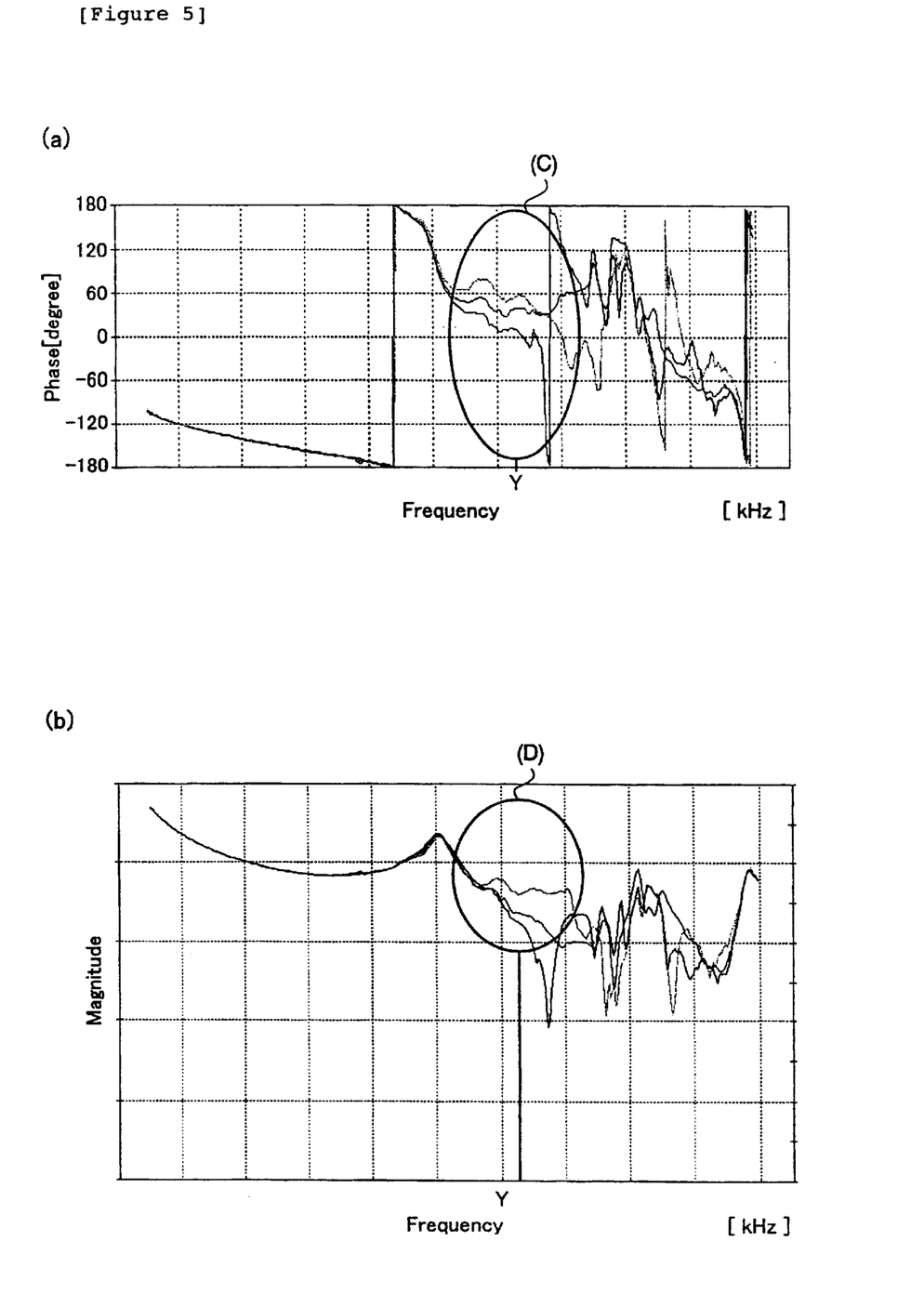
Figure 6:
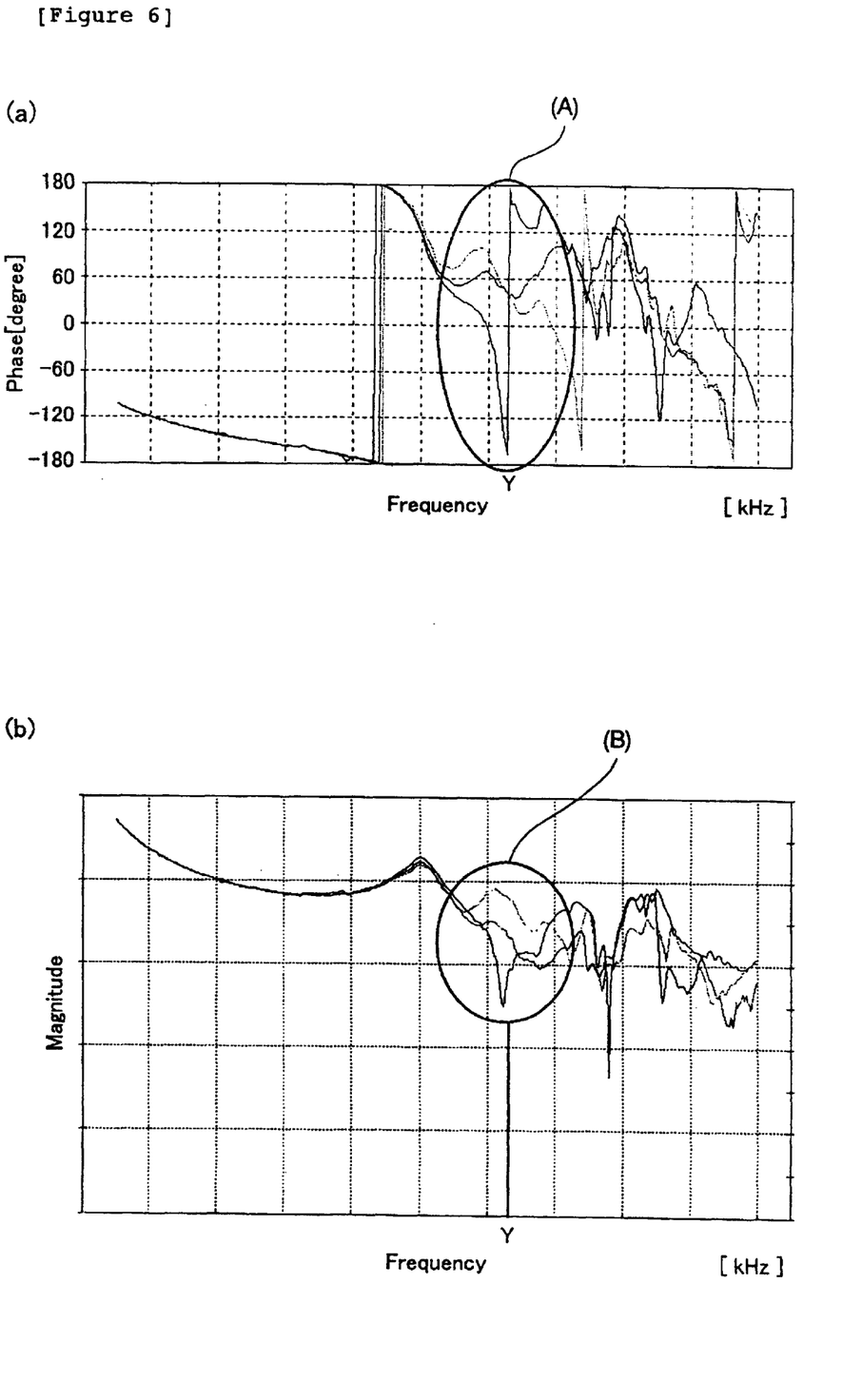

To verify the effect of the installation of the first and second ribs 28 and 29, measurement was made. The measurement results are shown in FIGS. 4, 5 and 6. FIG. 4 shows a change in sound power when the octave band (frequency) is changed for the above-described hard disk drive 20 provided with the first and second ribs 28 and 29 (solid line in FIG. 4) and a hard disk drive without the first and second ribs 28 and 29, that is, the conventional hard disk drive (broken line in FIG. 4). As shown in FIG. 4, at the particular octave band X [Hz], the sound power of the above-described hard disk drive 20 provided with the first and second ribs 28 and 29 is significantly lower than that of the conventional type.

Also, FIG. 5 shows the measurement results for the above-described hard disk drive 20 provided with the first and second ribs 28 and 29, and FIG. 6 shows the measurement results for the hard disk drive without the second rib 29, that is, the conventional hard disk drive, the figure being given for comparison. In these figures, FIGS. 5A and 6A show a change in phase (axis of ordinates) of the magnetic head 12 of the actuator 10 caused when the frequency of excited vibration (axis of abscissas) is changed, and FIGS. 5B and 6B show the magnitude of vibration (axis of ordinates) of the magnetic head 12 when the frequency (axis of abscissas) is changed. The figures show measurement results for the magnetic heads 12 corresponding to three magnetic disks 6 of the first, fifth and eighth ones from the side of the bottom plate 24 of the base 21 of eight magnetic disks 6, for example.

Comparing the measurement results for the hard disk drive 20 of this embodiment shown in FIG. 5 with the measurement results for the conventional hard disk drive without the second rib 29 shown in FIG. 6, for the conventional type shown in FIG. 6, the phase is great and a difference in phase between the magnetic heads 12 is large in the vicinity of the particular frequency Y [kHz] (portion denoted by the symbol (A) in FIG. 6A). This indicates that the phase is inverted at the outside magnetic head 12 (first one), so that the pivot is tilted. Further, in the vicinity of the particular frequency Y, the vibration increases in magnitude (=resonates: portion denoted by the symbol (B) in FIG. 6B), which indicates that the resonance frequency of the actuator 10 coincides with the resonance frequency of the base 21, so that resonance occurs. Contrarily, in FIG. 5, a difference in phase between the magnetic heads 12 is small in the vicinity of the particular frequency Y [kHz] (portion denoted by the symbol (C) in FIG. 5A), and moreover the magnitude of vibration decreases (portion denoted by the symbol (D) in FIG. 5B). Thus, it is found that by installing the second rib 29, the resonance frequency of the base 21 is shifted toward the high frequency region, so that resonance is less liable to occur.

Figure 7:
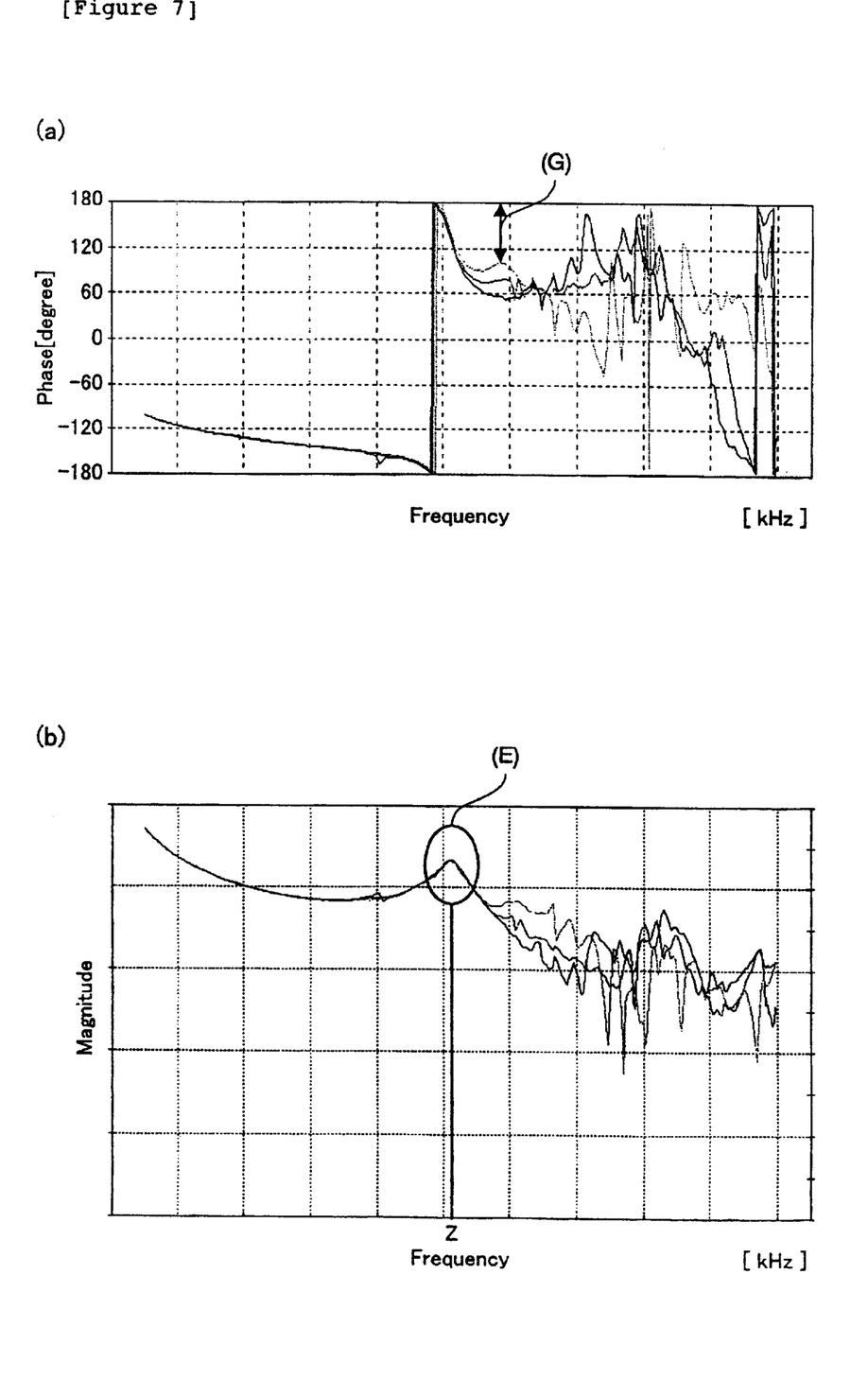
Figure 8:
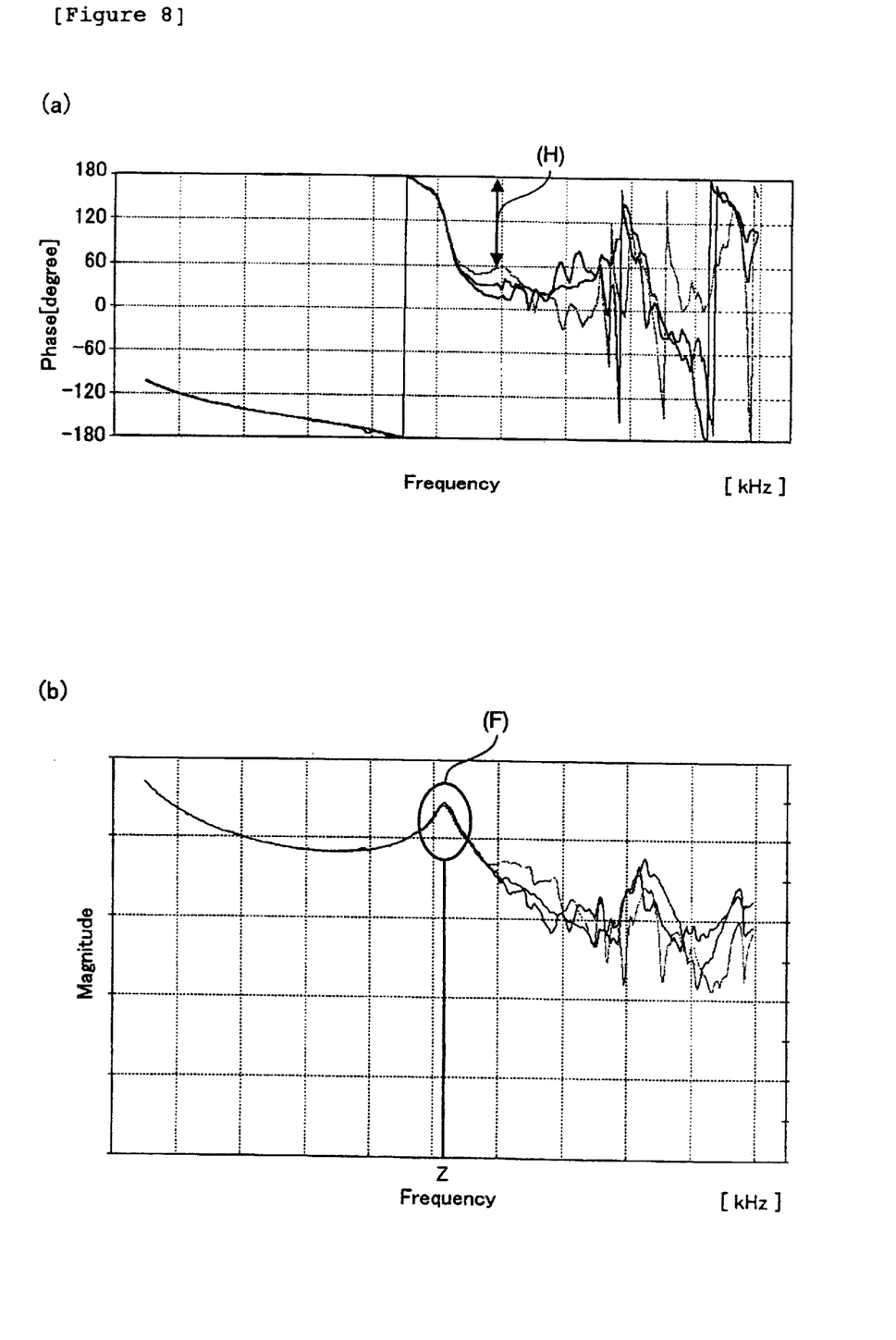

Accordingly, measurement for verifying the effect of installation of the vibration absorbing members 41 and 42 was made. The measurement results are shown in FIGS. 7 and 8. FIG. 7 shows the measurement results for the above-described hard disk drive 20 provided with the vibration absorbing members 41 and 42, and FIG. 8 shows the measurement results for a hard disk drive without the vibration absorbing members 41 and 42, the figure being given for comparison. As in the aforementioned FIGS. 5 and 6, FIGS. 7A and 8A show a change in phase (axis of ordinates) of the magnetic head 12 caused when the frequency (axis of abscissas) is changed, and FIGS. 7B and 8B show the magnitude of vibration (axis of ordinates) of the magnetic head 12.

Comparing the hard disk drive provided with the vibration absorbing members 41 and 42 with the hard disk drive without the vibration absorbing members 41 and 42, although a vibration of first butterfly mode (two-dimensional mode) (portions denoted by the symbols (E) and (F)) occurs in the vicinity of the frequency Z [kHz] in both of FIGS. 7B and 8B, the phase is smaller in FIG. 8A than in FIG. 7A (portions denoted by the symbols (G) and (H)). The reason for this is that by the installation of the vibration absorbing members 41 and 42, the vibration frequency of butterfly mode is increased, and the ratio of damping due to the vibration absorbing members 41 and 42 is increased. Thus, it is found that the installation of the vibration absorbing members 41 and 42 makes resonance less liable to occur.

Although the hard disk drive 20 is configured so as to have a plurality of magnetic disks 6 in the above-described embodiment, the number of magnetic disks 6 is not subject to any restriction, and further only one magnetic disk 6 may be provided. Also, although the configuration of this embodiment is such that the gasket 32 and the vibration absorbing members 41 and 42 are bonded to the cover 22, these elements may be bonded to the base 21. Also, although the vibration absorbing members 41 and 42 are made of the same material as that for the gasket 32 in the above-described embodiment, the material for the vibration absorbing members 41 and 42 may be any material that can efficiently absorb vibrations.

The present invention has several advantages. As described above, according to the disk drive apparatus in accordance with the present invention, a noise generated during operation can be reduced effectively. Also, according to the disk drive apparatus, hard disk drive, and enclosure therefor in accordance with the present invention, the reliability when data is read and written can be enhanced.

In addition to the above-described changes, the configuration described in the above embodiment can be chosen or changed appropriately to another configuration without departing from the spirit and scope of the present invention.

What is claimed is:

1. A disk drive apparatus, comprising:
   a disk driving source for rotationally driving a disk medium, the medium being used to store data;
   an actuator pivotally mounted on a rotating shaft, to which a head is attached to read and write data from and on the disk medium;
   an enclosure for containing the disk driving source and the actuator, the enclosure having an opening, a bottom plate for supporting the rotating shaft, a peripheral wall at an outer periphery of the bottom plate, and a rib formed n the bottom plate that extends from the peripheral wall toward the rotating shaft; and
   a cover for sealing the opening the enclosure, and a vibration absorbing member for absorbing vibrations of the cover between the cover and the rib.

2. A disk drive apparatus, comprising:
   a disk driving source for rotationally driving a disk medium, the medium being used to store data;
   an actuator pivotally mounted to a rotating shaft, to which a head is attached to read and write data from and on the disk medium;
   an enclosure for containing t e disk driving source and the actuator, the enclosure having an opening, a bottom plate for supporting the rotating shaft, a peripheral wall at an outer periphery of the bottom plate, and a rib formed on the bottom plate tat extends from the peripheral wall toward the rotating shaft, the rib being on both sides of an axis of the rotating shaft; and wherein
   a connection rib is formed between the rib on both sides of the axis of the rotating shaft in order to connect both of the ribs to each other.

3. A disk drive apparatus, comprising:
   a disk driving source for rotationally driving a disk medium, the medium being used to store data;
   an actuator pivotally mounted a rotating shaft, and having a head to read and write data from and on the disk medium;
   an enclosure for containing the disk driving source and the actuator, the enclosure having an opening formed therein by a peripheral wall formed at the periphery of a bottom plate;
   a cover for sealing the opening in the enclosure at a plurality of locations;
   a gasket interposed between the cover and the peripheral wall of the enclosure;
   a vibration absorbing member in a contact with the cover on an inside portion where the cover is opposed to the peripheral wall; and
   the vibration absorbing member being held between a wall body formed in the enclosure at a periphery of an actuator driving surface for driving the actuator and the cover, the wall body being a rib for reinforcing the enclosure.

4. The disk drive apparatus of claim 3 wherein the vibration absorbing member is disposed between a portion where the cover is fixed to the peripheral wall of the enclosure and a portion where the cover is fixed to the rotating shaft.

5. A hard disk drive, comprising:
   a disk enclosure having a box-shaped base with an opening and a cover for sealing the opening;
   a disk medium for storing data magnetically, the disk medium being rotationally driven by a spindle motor;
   an actuator having a magnetic head for reading and writing data from and on the disk medium to seek the magnetic head relative to the disk medium by moving pivotally around a pivot, wherein the base supports the pivot, and a stiffness reinforcing portion for reinforcing stiffness of the base is formed at an area where a reaction force acts on the base via the pivot by pivotal motion of the actuator; and
   the base having a bottom plate for supporting the pivot and a peripheral wall formed along an outer periphery of the bottom plate, and the stiffness reinforcing portion is a rib formed integrally with the bottom plate, and the rib is L-shaped and has an extending portion extending from the peripheral wall and a bent portion bent from a tip end of the extending portion.

6. The hard disk drive of claim 5 wherein the area is located on a line that is orthogonal to an axis of the actuator and passes through the pivot.

7. The hard disk drive of claim 5 wherein the rib is provided on both sides of the pivot and extends from two sides adjoining each other of the peripheral wall.

* * * * *

UNITED STATES PATENT AND TRADEMARK OFFICE
CERTIFICATE OF CORRECTION

PATENT NO. : 6,633,452 B2
DATED : October 14, 2003
INVENTOR(S) : Hirasaka et al.

It is certified that error appears in the above-identified patent and that said Letters Patent is hereby corrected as shown below:

Column 9,
Line 54, remove the word "n" between "formed" and "the" and insert the word -- on --.
Line 54, please insert the word -- in -- between the words "opening" and "the".
Line 65, please remove the word "t e" and insert the word -- the --.

Column 10,
Line 3, please remove the word "tat" and insert the word -- that --.
Line 28, please remove the word "surface" and insert the word -- source --.

Signed and Sealed this

Twenty-third Day of December, 2003

JAMES E. ROGAN
*Director of the United States Patent and Trademark Office*